United States Patent
Edwards et al.

(10) Patent No.: US 10,533,581 B2
(45) Date of Patent: Jan. 14, 2020

(54) STATOR WITH SUPPORT STRUCTURE FEATURE FOR TUNED AIRFOIL

(71) Applicant: United Technologies Corporation, Farmington, CT (US)

(72) Inventors: William R. Edwards, Stratham, NH (US); Charles H. Warner, South Portland, ME (US)

(73) Assignee: United Technologies Corporation, Farmington, CT (US)

( * ) Notice: Subject to any disclaimer, the term of this patent is extended or adjusted under 35 U.S.C. 154(b) by 743 days.

(21) Appl. No.: 15/373,774

(22) Filed: Dec. 9, 2016

(65) Prior Publication Data
US 2018/0163751 A1    Jun. 14, 2018

(51) Int. Cl.
   *F04D 29/66*      (2006.01)
   *F04D 29/54*      (2006.01)

(52) U.S. Cl.
   CPC ......... *F04D 29/668* (2013.01); *F04D 29/544* (2013.01)

(58) Field of Classification Search
   CPC ..... F01D 5/10; F01D 5/16; F01D 5/26; F01D 25/06; F01D 25/04; F04D 29/668; F04D 29/544; Y02T 50/673; F05D 2260/961; F05D 2260/964
   See application file for complete search history.

(56) References Cited

U.S. PATENT DOCUMENTS

| | | | |
|---|---|---|---|
| 5,203,676 A | 4/1993 | Ferleger et al. | |
| 5,524,341 A | 6/1996 | Ferleger et al. | |
| 6,379,112 B1 | 4/2002 | Montgomery | |
| 6,471,482 B2 | 10/2002 | Montgomery et al. | |
| 7,024,744 B2 | 4/2006 | Martin et al. | |
| 7,252,481 B2 | 8/2007 | Stone | |
| 8,834,098 B2 | 9/2014 | Glaspey | |
| 9,410,436 B2 | 8/2016 | Kulathu et al. | |
| 2012/0317772 A1 | 12/2012 | Herbold et al. | |
| 2013/0142640 A1* | 6/2013 | Houston | F01D 9/041 415/208.2 |
| 2014/0064973 A1* | 3/2014 | Ren | F04D 19/002 416/204 R |
| 2016/0024940 A1* | 1/2016 | Wilber | F01D 5/147 416/229 A |
| 2016/0061046 A1* | 3/2016 | Ols | F01D 5/143 415/211.1 |
| 2017/0175776 A1* | 6/2017 | Theratil | F01D 5/16 |

FOREIGN PATENT DOCUMENTS

| | | |
|---|---|---|
| EP | 1529926 | 5/2005 |
| EP | 2204536 | 7/2010 |

OTHER PUBLICATIONS

European Search Report for Application No. 17206554.2 dated May 8, 2018.

* cited by examiner

*Primary Examiner* — Hieu T Vo
*Assistant Examiner* — Arnold Castro
(74) *Attorney, Agent, or Firm* — Carlson, Gaskey & Olds, P.C.

(57) ABSTRACT

A vane stage assembly includes an airfoil including a leading edge and a trailing edge. An inner shroud extends from the leading edge to the trailing edge for supporting the airfoil. The shroud includes a forward portion including an axial width and a forward thickness extending in a radial direction. A ratio of the forward radial thickness divided by the forward axial thickness is between 0.64 and 1.11 for defining a natural frequency of the airfoil. A gas turbine engine and method are also disclosed.

26 Claims, 3 Drawing Sheets

STATOR WITH SUPPORT STRUCTURE FEATURE FOR TUNED AIRFOIL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The compressor and turbine sections include stator vanes including an airfoil supported between supporting shrouds and support structures. The airfoils are subject to flow forces through the engine which produce vibrational frequencies. The shape of the airfoil is configured to define a desired natural frequency. An undesired natural frequency can generate undesired fatigue and distressed parts.

Turbine engine manufacturers continue to seek further improvements to engine performance including improvements to thermal, transfer and propulsive efficiencies.

SUMMARY

In a featured embodiment, a vane stage assembly includes an airfoil including a leading edge and a trailing edge. An inner shroud extends from the leading edge to the trailing edge for supporting the airfoil. The shroud includes a forward portion including an axial width and a forward thickness extending in a radial direction. A ratio of the forward radial thickness divided by the forward axial thickness is between 0.64 and 1.11 for defining a natural frequency of the airfoil.

In another embodiment according to the previous embodiment, the shroud includes a forward portion with a forward radial thickness and a middle portion with a middle thickness and ratio of the forward radial thickness divided by the middle thickness is between 1.40 and 2.93.

In another embodiment according to any of the previous embodiments, the shroud includes a forward portion with a forward axial thickness and a middle portion with a middle thickness and the ratio of the forward axial thickness divided by the middle thickness is between 1.93 and 3.00.

In another embodiment according to any of the previous embodiments, a ratio of the forward radial thickness divided by the forward axial thickness is between 1.24 and 2.39 for defining a natural frequency of the airfoil.

In another embodiment according to any of the previous embodiments, the shroud includes a forward portion with a forward radial thickness and a middle portion with a middle thickness and ratio of the forward radial thickness divided by the middle thickness is between 1.73 and 3.76.

In another embodiment according to any of the previous embodiments, the shroud includes a forward portion with a forward axial thickness and a middle portion with a middle thickness and the ratio of the forward axial thickness divided by the middle thickness is between 1.06 and 2.05.

In another embodiment according to any of the previous embodiments, includes an outer shroud disposed radially outward of the airfoil. The outer shroud includes at least one shroud rail that includes a radial thickness, and a ratio of the radial thickness to the middle thickness of the inner shroud is between 2.61 and 4.58.

In another embodiment according to any of the previous embodiments, includes an outer shroud disposed radially outward of the airfoil. The outer shroud includes at least one shroud rail. At least one rail includes a radial thickness, and a ratio of the radial thickness to the middle thickness of the inner shroud is between 3.21 and 5.95.

In another embodiment according to any of the previous embodiments, the inner shroud is a full ring single continuous circumferential support, but is not limited to full ring.

In another featured embodiment, a gas turbine engine includes a compressor section including a stator vane stage assembly including an airfoil supported between an outer shroud and an inner shroud. The shroud includes a forward portion including an axial width and a forward thickness extending in a radial direction. A ratio of the forward radial thickness divided by the forward axial width thickness is between 0.64 and 1.11 for defining a natural frequency of the airfoil.

In another embodiment according to the previous embodiment, the shroud includes a forward portion with a forward radial thickness and a middle portion with a middle thickness and a ratio of the forward radial thickness divided by the middle thickness is between 1.40 and 2.93.

In another embodiment according to any of the previous embodiments, the shroud includes a forward portion with a forward axial thickness and a middle portion with a middle thickness and a ratio of the axial thickness divided by the middle thickness is between 1.93 and 3.00.

In another embodiment according to any of the previous embodiments, a ratio of the forward radial thickness divided by the forward axial width thickness is between 1.24 and 2.39 for defining a natural frequency of the airfoil.

In another embodiment according to any of the previous embodiments, the shroud includes a forward portion with a forward radial thickness and a middle portion with a middle thickness and a ratio of the forward radial thickness divided by the middle thickness is between 1.73 and 3.76.

In another embodiment according to any of the previous embodiments, the shroud includes a forward portion with a forward axial thickness and a middle portion with a middle thickness and a ratio of the axial thickness divided by the middle thickness is between 1.06 and 2.05.

In another embodiment according to any of the previous embodiments, the forward thickness extends in an axial direction parallel to the engine axis and the middle thickness extends in a radial direction from the engine axis.

In another embodiment according to any of the previous embodiments, the forward portion extends aft past the airfoil leading edge and the forward radial thickness is disposed within a plane common with the leading edge of the airfoil.

In another embodiment according to any of the previous embodiments, the outer shroud includes at least one shroud rail and the rail includes a radial thickness.

In another featured embodiment, a method of tuning airfoils in a stator vane assembly of a gas turbine engine, the method includes forming an inner shroud including a forward portion including a forward radial thickness and an axial width. An airfoil is formed supported by the inner shroud. The forward portion is formed to provide a ratio of the forward radial thickness divided by the axial width between 0.64 and 1.11 for defining a natural frequency of the airfoil.

In another embodiment according to any of the previous embodiments, the ratio of the forward radial thickness divided by the middle thickness is between 1.40 and 2.93.

In another embodiment according to any of the previous embodiments, the forward axial thickness extends in an axial direction parallel to the engine axis and the middle thickness extends in a radial direction from the engine axis and a ratio of the axial width divided by the middle thickness is between 1.93 and 3.00.

In another embodiment according to any of the previous embodiments, the forward radial thickness divided by the axial width between 1.24 and 2.39 for defining a natural frequency of the airfoil.

In another embodiment according to any of the previous embodiments, the ratio of the forward radial thickness divided by the middle thickness is between 1.73 and 3.76.

In another embodiment according to any of the previous embodiments, the forward axial thickness extends in an axial direction parallel to the engine axis and the middle thickness extends in a radial direction from the engine axis and a ratio of the axial width divided by the middle thickness is between 1.06 and 2.05.

In another embodiment according to any of the previous embodiments, includes forming at least one shroud rail to include a radial thickness related to the middle thickness according to a ratio of the radial thickness divided by the middle thickness of the inner shroud between 2.61 and 4.58.

In another embodiment according to any of the previous embodiments, includes forming at least one shroud rail to include a radial thickness related to the middle thickness according to a ratio of the radial thickness divided by the middle thickness of the inner shroud between 3.21 and 5.95.

DETAILED DESCRIPTION

Figure 1:
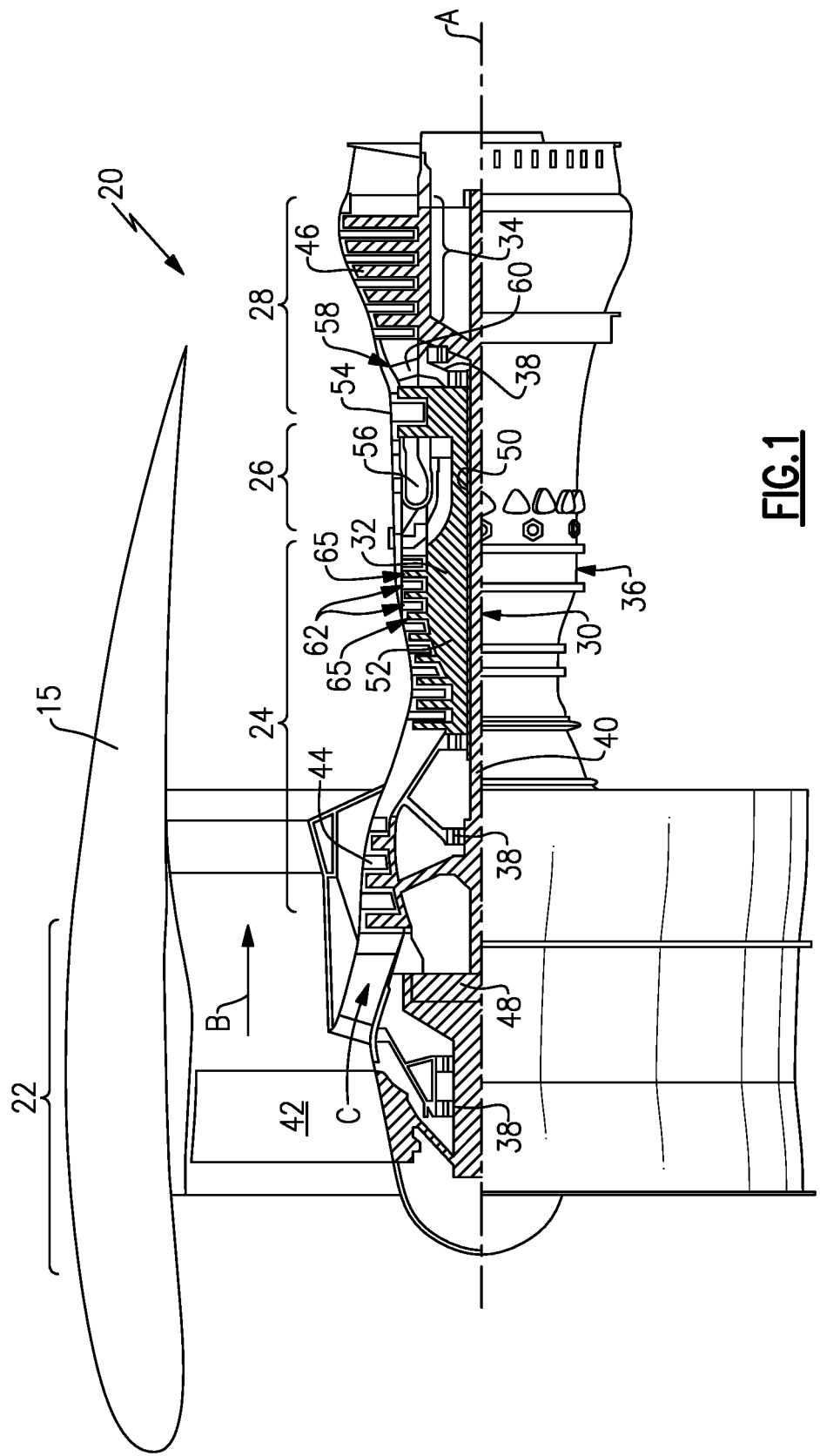
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example compressor section 24 includes a plurality of stator vane stage assemblies 62 interposed between rotating stages 65. In this example, a stator vane stage 62 is provided between each of the rotating stages 65 in the compressor section 24. It should be appreciated that although the example stator vane stage 62 is disposed within the compressor section 24 that stator vane stages are also utilized in the turbine section 28 and that stator vane stages within the turbine section 28 are within the contemplation of this disclosure.

Figure 2:
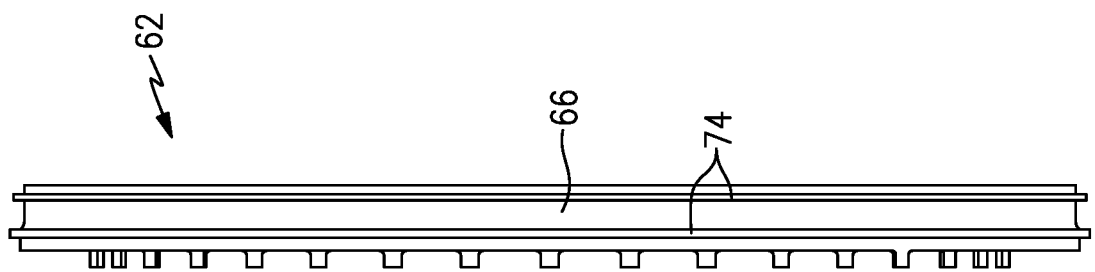
FIG. 2 is a side view of an example stator vane stage embodiment.
Figure 3:
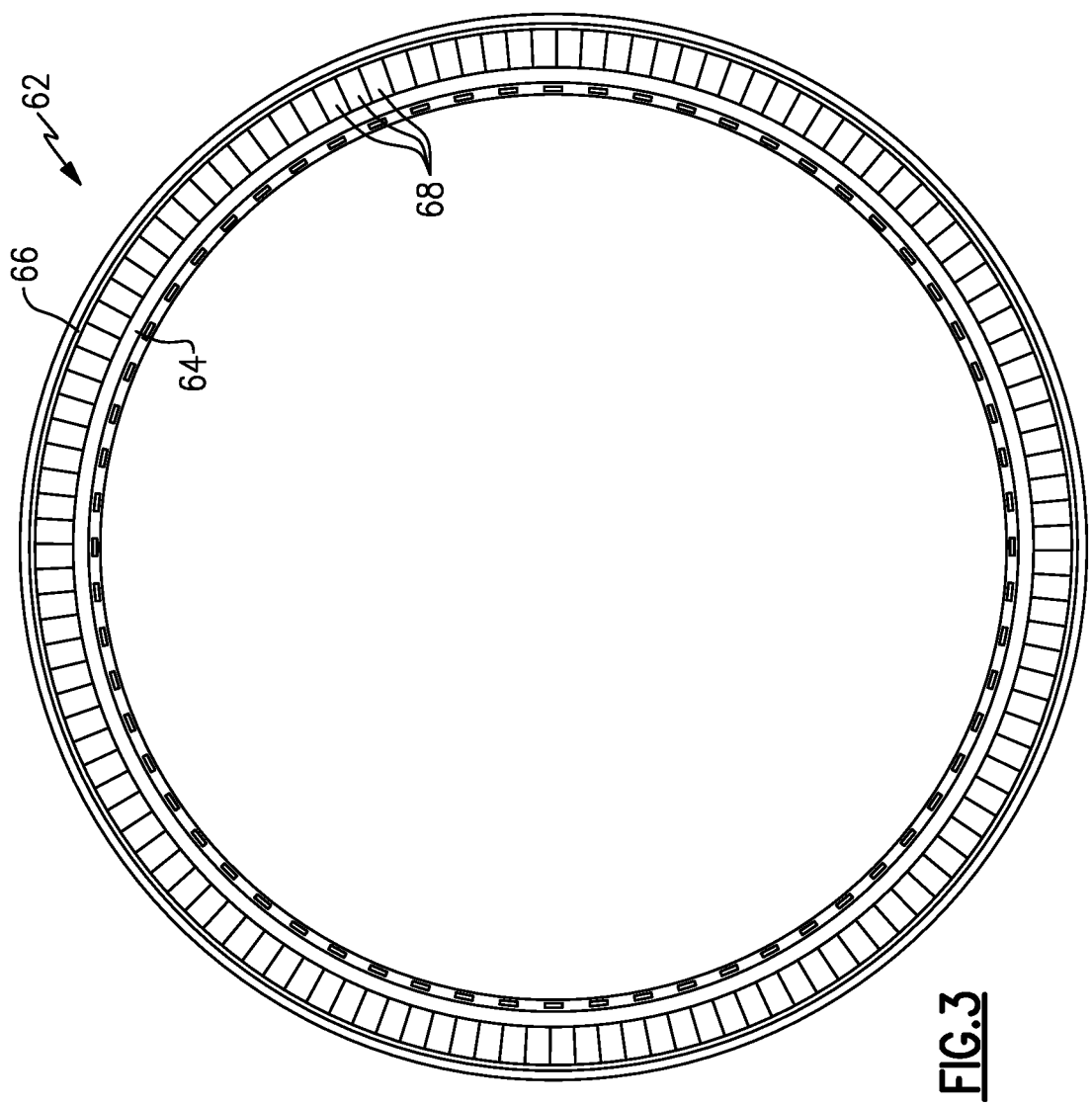
FIG. 3 is a front view of the example stator vane stage embodiment.

Referring to FIGS. 2 and 3 with continued reference to FIG. 1, the example vane stage 62 includes a radially inner shroud 64 and a radially outer shroud 66. A plurality of airfoils 68 are supported between the inner shroud 64 and the outer shroud 66. Spaces between the airfoils 68 defines a flow path for the core airflow C moving through the compressor section 24. In this example, the inner shroud 64 comprises a single continuous full ring member. Moreover, the outer shroud 66 also comprises a single continuous full ring shroud. Although a single inner shroud 64 and outer shroud 66 are illustrated and described by way of example other configurations including multiple shroud pieces are also within the contemplation of this disclosure.

Figure 4:
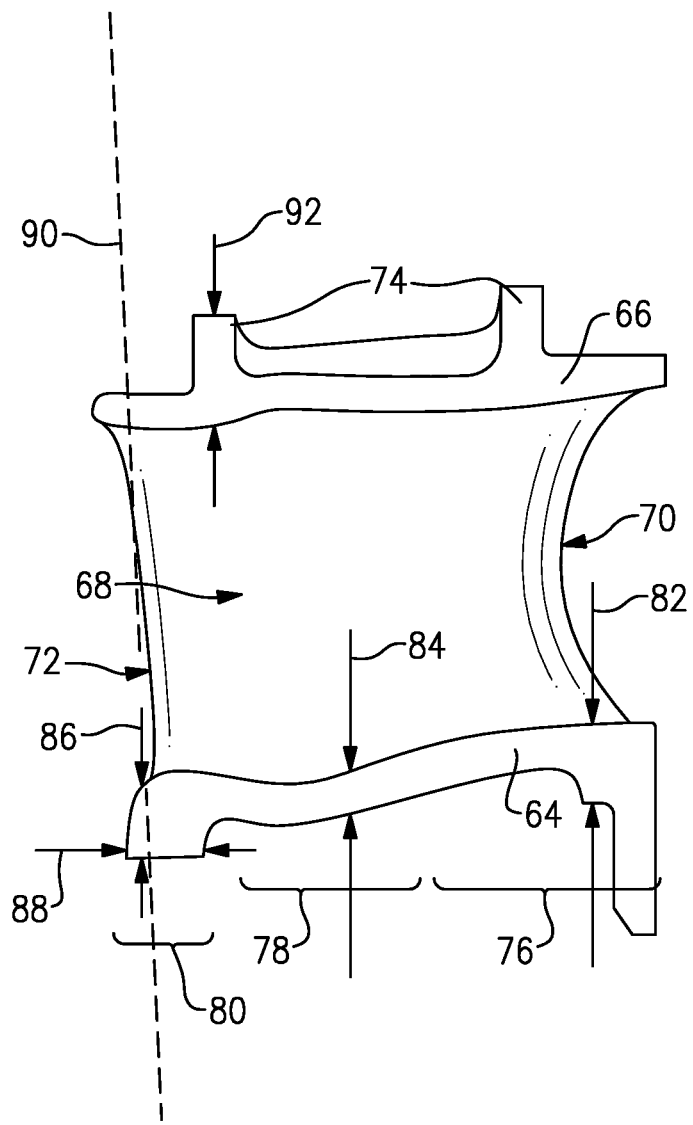
FIG. 4 is a sectional view of an example stator vane.

Referring to FIG. 4 with continued reference to FIGS. 2 and 3, a section through a portion of the vane stage 62 illustrated to show a cross section of the outer shroud 66 and the inner shroud 64. The outer shroud 66 includes rails 74 that extend radially outward relative to the engine longitudinal axis A.

The airfoil 68 includes a leading edge 72 and a trailing edge 70. The geometry of the airfoil 68 is provided to create a desired aerodynamic performance characteristic. Accordingly, the geometry of the airfoil 68 may be relatively complex. The geometry required to provide the desired aerodynamic performance may conflict with structural requirements. The airfoil 68 is subject to cyclical forces during engine operation that induce vibrations. A natural frequency of the airfoil 68 is set to be within a range that provides a robust structural design and performance. Accordingly, natural frequency values are tuned to provide a robust structural design that minimizes structural distress that may result from improperly tuned airfoils 68.

Modification to the airfoil 68 to provide the desired natural frequency can be obtained by changing the airfoil geometry 68. However, such changes to the airfoil geometry are difficult and increase complexity. The stator vane stage 62 in this disclosure includes modification to the inner shroud 64 and/or the outer shroud 66 to tune the airfoil natural frequency. By modifying the shrouds 64, 66 instead of the airfoil 68, desired tuning of the natural frequency can be provided without changes to the desired aerodynamic performance provided by the geometry of the airfoil 68.

In the disclosed example embodiment, a relationship between portions of the inner shroud 64 are tailored to tune the airfoil 68. Instead, of changing the geometry of any of the airfoils 68 to provide the desired tuning, the geometry of the inner and outer shroud is modified to provide the desired geometry to tune the airfoil to minimize the effects of natural frequencies.

The example inner shroud 64 includes an aft portion 76, a middle portion 78 and a forward portion 80. The aft portion 76 includes a thickness 82 in a radial direction relative to the engine axis A. The middle portion 78 includes a middle thickness 84. The forward portion 80 includes a forward radial thickness 86. The forward portion 80 also includes an axial width 88. The radial thickness 86 is measured within a radial plane 90 substantially corresponding with a leading edge 72 of the airfoil 68.

In this example, the inner shroud 64 is modified to provide a middle thickness 84 relative to the thickness 86 of the forward portion 80 that changes a stiffness of the inner shroud 64 to provide the desired tuning of the vane stage assembly 62. The relationship between the forward radial thickness 86 and the middle thickness 84 is reflected as a desired ratio of the forward thickness 86 divided by the middle thickness 84. In one example embodiment, a ratio between the forward radial thickness 86 divided by the middle thickness 84 is between 2.93 and 1.40. In another disclosed example, a ratio between the forward radial thickness 86 divided by the middle thickness 84 is between 3.76 and 1.73. In one disclosed example, the forward thickness 86 is between about 0.105 inches (2.7 mm) and about 0.161 inches (4.1 mm) and the middle thickness is between about 0.055 inches (1.4 mm) and about 0.075 inches (1.9 mm).

In another disclosed example the forward radial thickness 86 is between about 0.158 inches (4.0 mm) and about 0.107 inches (2.7 mm) and the middle thickness is between about 0.042 inches (1.1 mm) and about 0.062 inches (1.6 mm).

An additional relationship between the axial width 88 and the radial thickness 86 may also be adjusted to tune the airfoil 68 and minimize undesired frequencies that may limit operational life. In one example, a ratio of the forward radial thickness 86 divided by the axial width 88 is between 1.11 and 0.64. In another disclosed embodiment, a ratio of the forward radial thickness 86 divided by the axial width 88 is between 2.39 and 1.24.

In one disclosed embodiment the axial width 88 is between 0.145 inches (3.7 mm) and 0.165 inches (4.2 mm). In another disclosed embodiment the axial width 88 is between about 0.066 inches (1.7 mm) and about 0.086 inches (2.2 mm).

In a further example embodiment a ratio of the axial width 88 divided by the middle radial thickness 84 is between about 1.93 and 3.00. In this disclosed embodiment the axial width 88 is between 0.145 inches (3.7 mm) and 0.165 inches (4.2 mm) and the middle radial thickness 84 is between about 0.055 inches (1.4 mm) and about 0.075 inches (1.9 mm).

In another example embodiment a ratio of the axial width 88 divided by the middle radial thickness 84 is between about 1.06 and 2.05. In this disclosed embodiment the axial width 88 is between 0.066 inches (1.7 mm) and 0.086 inches (2.1 mm) and the middle thickness 84 is between about 0.042 inches (1.1 mm) and about 0.062 inches (1.6 mm).

Not only may the inner shroud 64 be modified to tune the frequency of the airfoil 68 but the outer shroud 66 may also be modified. In this example, the outer shroud 66 includes the rails 74. Each of the rails 74 includes a radial thickness 92. This radial thickness 92 is modified to provide a desired thickness that inhibits damaging frequencies during operation. In one disclosed embodiment, a ratio of the rail thickness 92 to the middle thickness 84 is between 4.58 and 2.61. In another disclosed embodiment, the ratio between the rail thickness 92 and the middle thickness 84 of the lower shroud 64 is between 5.95 and 3.21. In one disclosed embodiment the rail thickness is between about 0.252 inches (6.4 mm) and 0.196 inches (5.0 mm) and the middle thickness is between about 0.055 inches (1.4 mm) and about 0.075 inches (1.9 mm). In another disclosed example, the rail thickness is between about 0.250 inches (6.4 mm) and 0.199 inches (5.1 mm) and the middle thickness is between about 0.042 inches (1.1 mm) and about 0.062 inches (1.6 mm).

The example vane stage assembly 62 modification of different portions of the inner shroud 64 and the outer shroud 66 is utilized to provide an airfoil natural frequency. Natural frequency values are tuned to desired values in order to provide a robust structural design and to minimize airfoil structural distress caused by mistuned airfoils. Accordingly, the example vane stage assembly includes shrouds that include specific ratios to enable optimization of airfoil frequencies without changing airfoil geometry that is optimized to provide desired aerodynamic characteristic.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A vane stage assembly comprising:
    an airfoil including a leading edge and a trailing edge; and
    an inner shroud extending from the leading edge to the trailing edge for supporting the airfoil, the shroud including a forward portion including an axial width and a forward thickness extending in a radial direction, wherein a ratio of the forward radial thickness divided by the forward axial thickness is between 0.64 and 1.11 for defining a natural frequency of the airfoil.

2. The vane stage assembly as recited in claim 1, wherein the shroud includes a forward portion with a forward radial thickness and a middle portion with a middle thickness and ratio of the forward radial thickness divided by the middle thickness is between 1.40 and 2.93.

3. The vane stage assembly as recited in claim 1, wherein the shroud includes a forward portion with a forward axial thickness and a middle portion with a middle thickness and the ratio of the forward axial thickness divided by the middle thickness is between 1.93 and 3.00.

4. The vane stage assembly as recited in claim 1, wherein a ratio of the forward radial thickness divided by the forward axial thickness is between 1.24 and 2.39 for defining a natural frequency of the airfoil.

5. The vane stage assembly as recited in claim 1, wherein the shroud includes a forward portion with a forward radial thickness and a middle portion with a middle thickness and ratio of the forward radial thickness divided by the middle thickness is between 1.73 and 3.76.

6. The vane stage assembly as recited in claim 1, wherein the shroud includes a forward portion with a forward axial thickness and a middle portion with a middle thickness and the ratio of the forward axial thickness divided by the middle thickness is between 1.06 and 2.05.

7. The vane stage assembly as recited in claim 1, including an outer shroud disposed radially outward of the airfoil, wherein the outer shroud includes at least one shroud rail that includes a radial thickness, and a ratio of the radial thickness to the middle thickness of the inner shroud is between 2.61 and 4.58.

8. The vane stage assembly as recited in claim 1, including an outer shroud disposed radially outward of the airfoil, wherein the outer shroud includes at least one shroud rail, wherein at least one rail includes a radial thickness, and a ratio of the radial thickness to the middle thickness of the inner shroud is between 3.21 and 5.95.

9. The vane stage assembly as recited in claim 1, wherein the inner shroud is a full ring single continuous circumferential support.

10. A gas turbine engine comprising:
    a compressor section including a stator vane stage assembly including an airfoil supported between an outer shroud and an inner shroud, the shroud including a forward portion including an axial width and a forward thickness extending in a radial direction, wherein a ratio of the forward radial thickness divided by the forward axial width thickness is between 0.64 and 1.11 for defining a natural frequency of the airfoil.

11. The gas turbine engine as recited in claim 10, wherein the shroud includes a forward portion with a forward radial thickness and a middle portion with a middle thickness and a ratio of the forward radial thickness divided by the middle thickness is between 1.40 and 2.93.

12. The gas turbine engine as recited in claim 10, wherein the shroud includes a forward portion with a forward axial thickness and a middle portion with a middle thickness and a ratio of the axial thickness divided by the middle thickness is between 1.93 and 3.00.

13. The gas turbine engine as recited in claim 10, wherein a ratio of the forward radial thickness divided by the forward axial width thickness is between 1.24 and 2.39 for defining a natural frequency of the airfoil.

14. The gas turbine engine as recited in claim 10, wherein the shroud includes a forward portion with a forward radial thickness and a middle portion with a middle thickness and a ratio of the forward radial thickness divided by the middle thickness is between 1.73 and 3.76.

15. The gas turbine engine as recited in claim 10, wherein the shroud includes a forward portion with a forward axial thickness and a middle portion with a middle thickness and a ratio of the axial thickness divided by the middle thickness is between 1.06 and 2.05.

16. The gas turbine engine as recited in claim 10, wherein the forward thickness extends in an axial direction parallel to the engine axis and the middle thickness extends in a radial direction from the engine axis.

17. The gas turbine engine as recited in claim 10, wherein the forward portion extends aft past the airfoil leading edge and the forward radial thickness is disposed within a plane common with the leading edge of the airfoil.

18. The gas turbine engine as recited in claim 10, wherein the outer shroud includes at least one shroud rail and the rail includes a radial thickness.

19. A method of tuning airfoils in a stator vane assembly of a gas turbine engine, the method comprising:
    forming an inner shroud including a forward portion including a forward radial thickness and an axial width;
    forming an airfoil supported by the inner shroud; and forming the forward portion to provide a ratio of the forward radial thickness divided by the axial width between 0.64 and 1.11 for defining a natural frequency of the airfoil.

20. The method as recited in claim 19, wherein the ratio of the forward radial thickness divided by the middle thickness is between 1.40 and 2.93.

21. The method as recited in claim 19, wherein the forward radial thickness extends in an axial direction parallel to the engine axis and the middle thickness extends in a radial direction from the engine axis and a ratio of the axial width divided by the middle thickness is between 1.93 and 3.00.

22. The method as recited in claim 19, wherein the forward radial thickness divided by the axial width between 1.24 and 2.39 for defining a natural frequency of the airfoil.

23. The method as recited in claim 19, wherein the ratio of the forward radial thickness divided by the middle thickness is between 1.73 and 3.76.

24. The method as recited in claim 19, wherein the forward radial thickness extends in an axial direction parallel to the engine axis and the middle thickness extends in a radial direction from the engine axis and a ratio of the axial width divided by the middle thickness is between 1.06 and 2.05.

25. The method as recited in claim 19, including forming at least one shroud rail to include a radial thickness related to the middle thickness according to a ratio of the radial thickness divided by the middle thickness of the inner shroud between 2.61 and 4.58.

26. The method as recited in claim 19, including forming at least one shroud rail to include a radial thickness related to the middle thickness according to a ratio of the radial thickness divided by the middle thickness of the inner shroud between 3.21 and 5.95.

* * * * *